(12) United States Patent
Okada et al.

(10) Patent No.: US 8,081,382 B2
(45) Date of Patent: Dec. 20, 2011

(54) REFLECTIVE SCREEN, DISPLAY DEVICE, AND MOBILE APPARATUS

(75) Inventors: Naotada Okada, Kanagawa-ken (JP); Kazuo Horiuchi, Kanagawa-ken (JP); Haruhiko Okumura, Kanagawa-ken (JP); Takashi Sasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 297 days.

(21) Appl. No.: 12/407,518

(22) Filed: Mar. 19, 2009

(65) Prior Publication Data
US 2009/0244702 A1 Oct. 1, 2009

(30) Foreign Application Priority Data
Mar. 27, 2008 (JP) ................. 2008-084538

(51) Int. Cl.
*G02B 27/44* (2006.01)
*G02B 27/00* (2006.01)

(52) U.S. Cl. .................................................... 359/566

(58) Field of Classification Search .............. 359/204.5, 359/207.7, 211.6, 217.4, 337.21, 443, 449, 359/454, 459, 503, 505, 558, 566, 568, 577, 359/605
See application file for complete search history.

(56) References Cited

U.S. PATENT DOCUMENTS

| | | | | |
|---|---|---|---|---|
| 5,907,436 A * | 5/1999 | Perry et al. | ................ | 359/576 |
| 7,524,073 B2 * | 4/2009 | Miyawaki | ................ | 362/19 |
| 2002/0089750 A1 * | 7/2002 | Hoshi | ................ | 359/566 |
| 2008/0316600 A1 * | 12/2008 | Koyanagi et al. | ................ | 359/568 |
| 2010/0328774 A1 * | 12/2010 | Hong et al. | ................ | 359/568 |
| 2011/0075260 A1 * | 3/2011 | Shibayama et al. | ................ | 359/576 |

FOREIGN PATENT DOCUMENTS

| | | |
|---|---|---|
| JP | 9-101478 | 4/1997 |
| JP | 2006-350126 | * 12/2006 |

* cited by examiner

*Primary Examiner* — Clayton E LaBalle
*Assistant Examiner* — Kevin Butler
(74) *Attorney, Agent, or Firm* — Oblon, Spivak, McClelland, Maier & Neustadt, L.L.P.

(57) ABSTRACT

A reflective screen includes: a substrate having a first refractive index; and a periodic structure provided on a major surface of the substrate and including a periodic film which has a period $\Lambda$ and is made of a material having a second refractive index that is higher than the first refractive index. The period $\Lambda$ is not less than $400/(N+1)$ nm and not more than $680/(N-1)$ nm, where N is an equivalent refractive index of the periodic film.

13 Claims, 10 Drawing Sheets

REFLECTIVE SCREEN, DISPLAY DEVICE, AND MOBILE APPARATUS

CROSS-REFERENCE TO RELATED APPLICATIONS

This application is based upon and claims the benefit of priority from the prior Japanese Patent Application No. 2008-084538, filed on Mar. 27, 2008; the entire contents of which are incorporated herein by reference.

BACKGROUND OF THE INVENTION

1. Field of the Invention

This invention relates to a reflective screen, a display device, and a mobile apparatus.

2. Background Art

In a see-through display device, an image is projected on a reflective-transmissive screen to visually present the background of the screen in combination with the projected image. Here, the projected image is reflected from the frontside and backside of the screen having a certain thickness to produce a parallax, which degrades viewability. This problem also occurs in the so-called head-up display (HUD), for example, which can project various traffic information on the windshield of a mobile apparatus, such as a car and an aircraft, to visually present the traffic information simultaneously with the external background image.

JP-A-9-101478(Kokai) discloses a technique based on a hologram combiner that reflects a specific range of wavelengths. However, the reflection wavelength range is wide and decreases the transmittance of white light. Hence, this technique cannot be used for the aforementioned applications.

JP-A-2006-350126(Kokai) discloses a technique related to a guided-mode resonant grating device in which grating members are periodically provided. However, this technique is intended to widen the reflection wavelength range by allowing the gratings to be contiguous to the air, and hence cannot be used for the aforementioned applications, which require a narrow reflection wavelength range.

SUMMARY OF THE INVENTION

According to an aspect of the invention, there is provided a reflective screen including: a substrate having a first refractive index; and a periodic structure provided on a major surface of the substrate and including a periodic film, the periodic film having a period $\Lambda$ and being made of a material having a second refractive index being higher than the first refractive index, the period $\Lambda$ being not less than $400/(N+1)$ nanometers and not more than $680/(N-1)$ nanometers, the N being an equivalent refractive index of the periodic film.

According to another aspect of the invention, there is provided s display device including: a light generator configured to generate light of wavelength $\lambda$ including image information; and a reflective screen, the light being projected on the reflective screen at incident angle $\theta$, the reflective screen including: a substrate having a first refractive index; and a periodic structure provided on a major surface of the substrate and including a periodic film, the periodic film having a period $\Lambda$ and being made of a material having a second refractive index being higher than the first refractive index, and the period $\Lambda$ being $\lambda/(N+\sin\theta)$ or $\lambda/(N-\sin\theta)$, the N being an equivalent refractive index of the periodic film.

According to another aspect of the invention, there is provided a mobile apparatus including: a display device including: a light generator configured to generate light of wavelength $\lambda$ including image information; and a reflective screen, the light being projected on the reflective screen at incident angle $\theta$, the reflective screen including: a substrate having a first refractive index; and a periodic structure provided on a major surface of the substrate and including a periodic film, the periodic film having a period $\Lambda$ and is made of a material having a second refractive index being higher than the first refractive index, and the period $\Lambda$ being $\lambda/(N+\sin\theta)$ or $\lambda/(N-\sin\theta)$, the N being an equivalent refractive index of the periodic film; and a window, the reflective screen attached to the window.

DETAILED DESCRIPTION OF THE INVENTION

Embodiments of the invention will now be described in detail with reference to the drawings.

First Embodiment

FIG. 1 is a schematic view illustrating the configuration of a reflective screen according to a first embodiment of the invention.

Figure 1A:
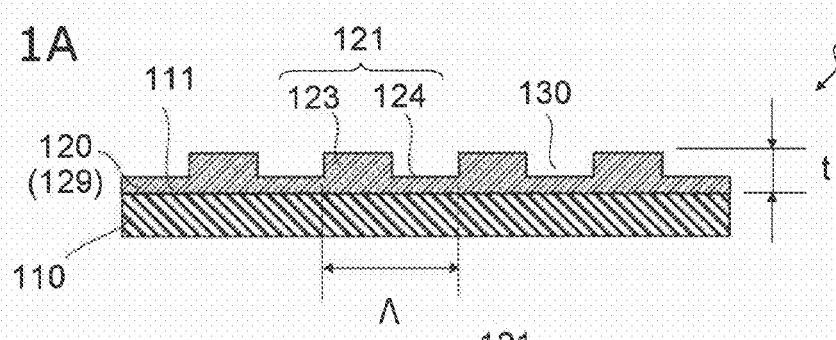
FIGS. 1A and 1B are schematic views illustrating the configuration of a reflective screen according to a first embodiment of the invention.
Figure 1B:
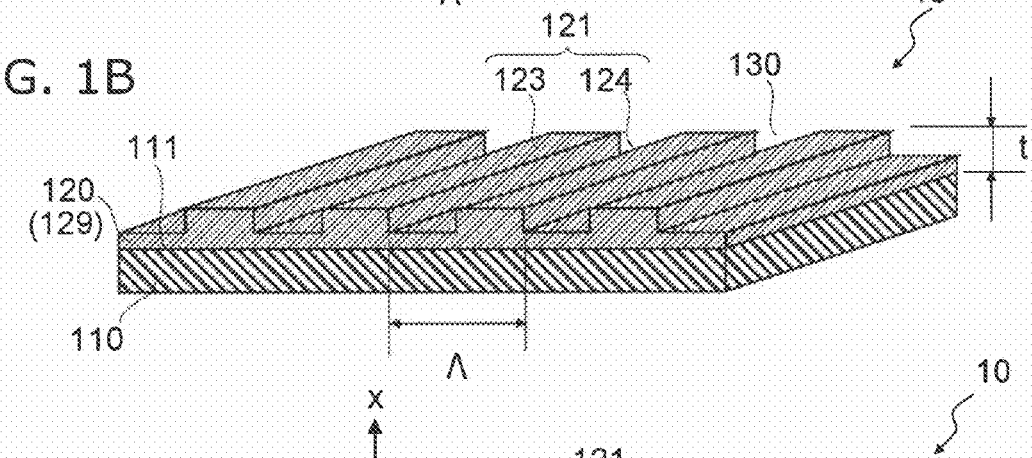

FIGS. 1A and 1B are a cross-sectional view and a perspective view, respectively. As shown in FIGS. 1A and 1B, the reflective screen 10 of the first embodiment includes a substrate 110 and a periodic film 120 provided on a major surface 111 of the substrate 110 and having a regular corrugation 121.

The substrate 110 can illustratively be made of an acrylic resin, and the refractive index (first refractive index) $n_1$ of the substrate 110 is illustratively 1.45. It is noted that the substrate 110 may be provided as a thin film on another plate-like or sheet-like substrate.

On the other hand, the periodic film 120 can illustratively be made of a dielectric thin film and has a second refractive index $n_2$, which is higher than the first refractive index $n_1$. For example, the second refractive index $n_2$ can be 1.9. Furthermore, the periodic film 120 has a corrugation 121 with regularity of period $\Lambda$ in the range of 400/(N+1) to 680/(N−1) nm (nanometers), where N is an equivalent refractive index.

For example, if the thickness t of the periodic film 120 is 180 nm, the first refractive index $n_1$=1.45, and the second refractive index $n_2$=1.9, then the equivalent refractive index N=1.49. Here, the period $\Lambda$ is set to 400/(N+1) to 680/(N−1) nm, i.e., 268-1082 nm. Specifically, the period $\Lambda$ is set to 0.68 μm (micrometers). Then, the reflective screen 10 has a photonic structure, which reflects linearly polarized incident light of a prescribed wavelength with very high reflectance and transmits light of the other wavelengths. In the above example, light having a wavelength of 530 nm (green light) is reflected, and light of the other wavelengths is transmitted.

Furthermore, for example, also in the case where $\Lambda$ is 0.24 μm, light having a wavelength of 530 nm (green light) is reflected, and light of the other wavelengths is transmitted.

In the case where $\Lambda$ is 0.29 μm or 0.81 μm, light having a wavelength of 630 nm (red light) is reflected, and light of the other wavelengths is transmitted.

In the case where $\Lambda$ is 0.21 μm or 0.58 μm, light having a wavelength of 450 nm (blue light) is reflected, and light of the other wavelengths is transmitted.

Thus, by providing a corrugation having a period $\Lambda$ of 400/(N+1) to 680/(N−1) nm, where N is an equivalent refractive index, and suitably setting the period $\Lambda$, only the light having a desired wavelength can be reflected with very high reflectance, whereas light of the other wavelengths can be transmitted. Here, because the reflective screen 10 has a photonic structure, there is no substantial light absorption. Hence, the reflective screen can reflect only a specific wavelength for image projection and transmit light of the other wavelengths. That is, the reflective screen achieves high reflectance while retaining high transmittance.

In the reflective screen illustrated in FIG. 1, the upper region 130 above the periodic film 120 is illustratively air, and the upper region refractive index $n_u$ is 1. That is, the refractive index of the protrusion 123 in the corrugation 121 of the periodic film 120 is equal to the second refractive index $n_2$, and the refractive index of the recess 124 is equal to the upper region refractive index $n_u$, where $n_2$ is higher than $n_u$. In this embodiment, the periodic film 120 serves as a periodic structure 129.

The reflective screen 10 of this embodiment is described below in detail with regard to its optical characteristics.

FIG. 2 is a schematic view illustrating the configuration of a reflective screen according to the first embodiment of the invention.

Figure 2A:
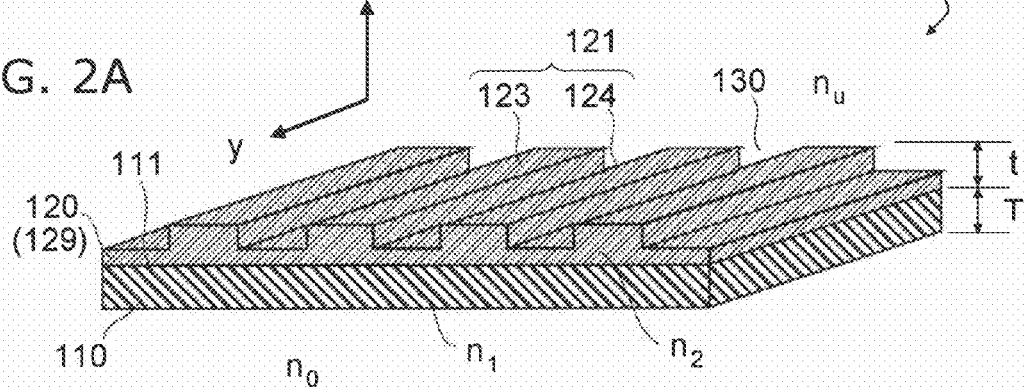
FIGS. 2A and 2B are schematic views illustrating the configuration of a reflective screen according to the first embodiment of the invention.

As shown in FIG. 2A, in the reflective screen 10 of the first embodiment of the invention, $n_0$ is the refractive index of the region below the substrate 110, $n_1$ is the refractive index (first refractive index) of the substrate 110, T is the thickness of the substrate 110, $n_2$ is the refractive index (second refractive index) of the periodic film 120, and t is the thickness of the periodic film 120. The refractive index of the upper region 130 (including the recess 124) above the periodic film 120 is denoted by $n_u$. The x-axis is taken in the direction perpendicular to the major surface 111 of the substrate 110, and the y-axis is taken in the direction perpendicular to the x-axis and also perpendicular to the periodic direction of the corrugation 121. Let $E_y(x)$ denote the y-component of the electric field, $H_y(x)$ denote the y-component of the magnetic field, $k_0$ be equal to $2\pi/\lambda$ ($\lambda$ being the wavelength), and n(x) be the refractive index. Furthermore, let a be the volume ratio between the protrusion 123 and the recess 124 in the periodic film 120, and the effective refractive index $n_2' = (a \cdot n_2^2 + (1-a) n_1^2)^{1/2}$ of the periodic film 120 is used. With regard to the above structure composed of the four layers having $n_0$, $n_1$, $n_2$, and $n_u$, an eigenvalue $\beta$ is determined as a solution to the differential equation (1) for TE polarization and the differential equation (2) for TM polarization. Then, the equivalent refractive index N is determined from $\beta = k_0 N$. Here, TE polarization is a polarization in which the oscillation plane of the electric field of incident light is parallel to the y-direction, and TM polarization is a polarization in which the oscillation plane of the electric field is perpendicular to the y-direction.

$$\frac{\partial^2 E_y(x)}{\partial x^2} + \{k_0^2 n(x)^2 - \beta^2\} E_y(x) = 0, \quad E_y(x) = 0 (x = \pm\infty) \quad (1)$$

$$\frac{\partial^2 H_y(x)}{\partial x^2} + \{k_0^2 n(x)^2 - \beta^2\} H_y(x) = 0, \quad H_y(x) = 0 (x = \pm\infty) \quad (2)$$

Figure 2B:
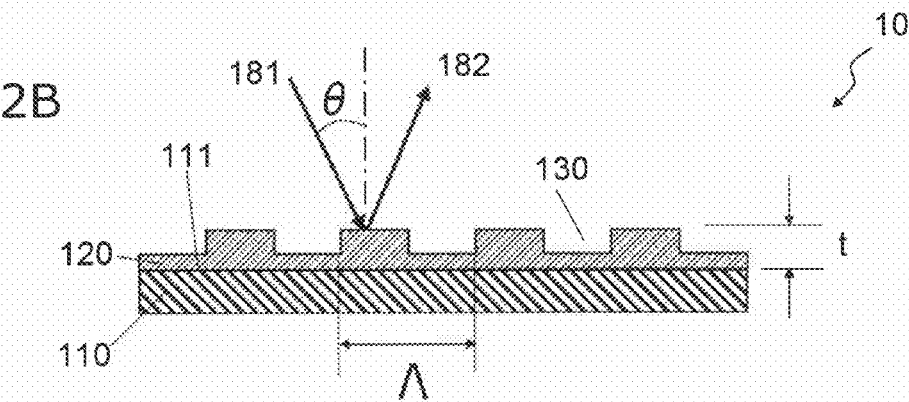

As shown in FIG. 2B, in the reflective screen 10, when a linearly polarized incident light 181 is incident at incident angle $\theta$ on the periodic film 120 having this equivalent refractive index N and the period $\Lambda$, resonance occurs at wavelength $\lambda$ satisfying equation (3):

$$\Lambda = \lambda(N \pm \sin\theta) \quad (3)$$

That is, at a specific wavelength $\lambda$, nearly 100% of the incident light is reflected, and light of the other wavelengths is transmitted.

Figure 3:
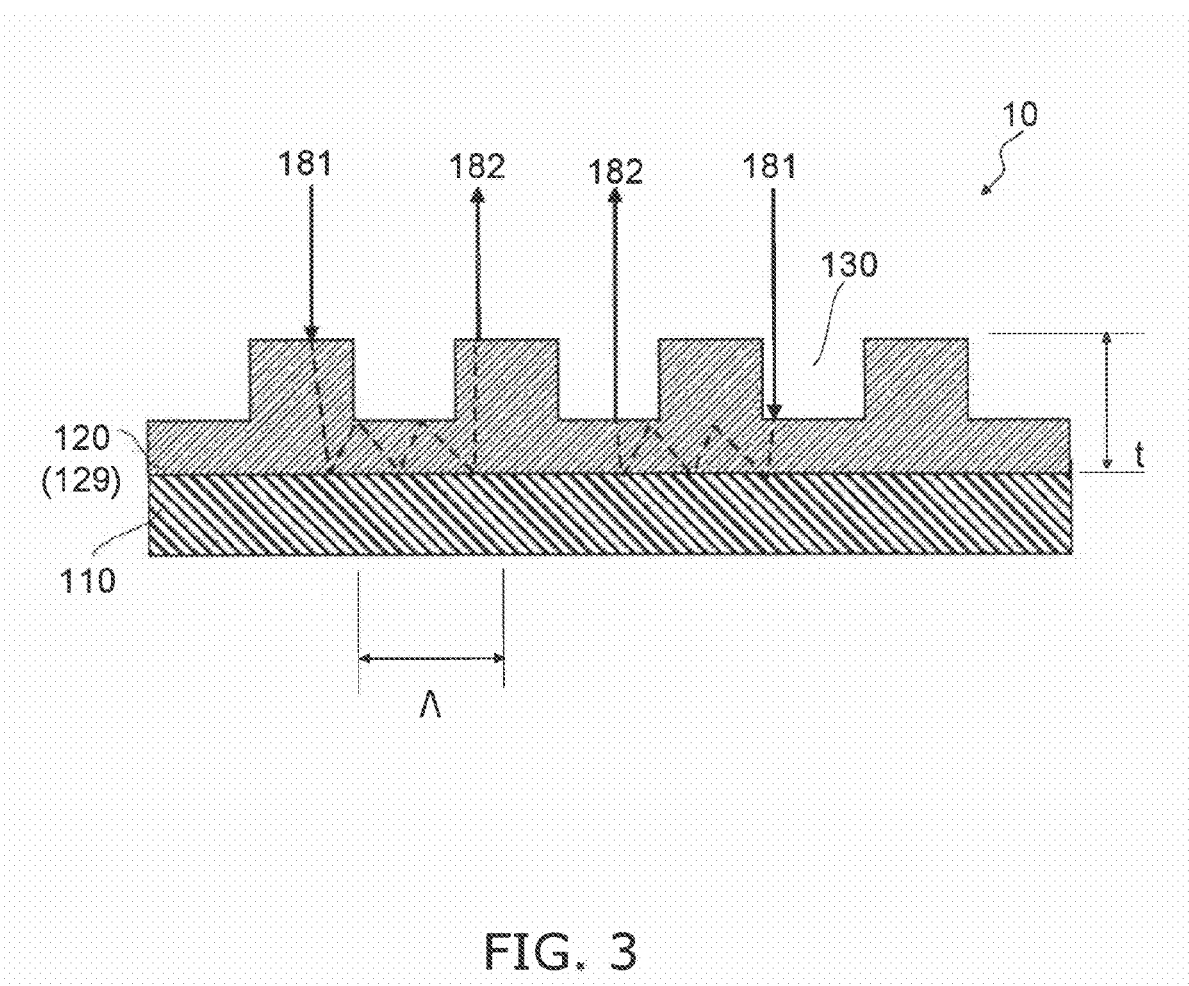
FIG. 3 is a schematic view illustrating the optical incidence/emission characteristics of the reflective screen according to the first embodiment of the invention.

FIG. 3 is a schematic view illustrating the optical incidence/emission characteristics of the reflective screen according to the first embodiment of the invention.

As shown in FIG. 3, in the presence of a corrugation having the specific period $\Lambda$ described above, when incident light 181 having a specific wavelength $\lambda$ is incident on the reflective screen 10, the incident light 181 is guided with no substantial loss in the periodic film 120 having a higher refractive index than the substrate 110, and emitted from the periodic film 120. That is, light of wavelength $\lambda$ can be reflected with no substantial loss, and light of the other wavelengths can be transmitted.

FIG. 4 is a graph illustrating the reflection/transmission characteristics of the reflective screen according to the first embodiment of the invention.

Figure 4A:
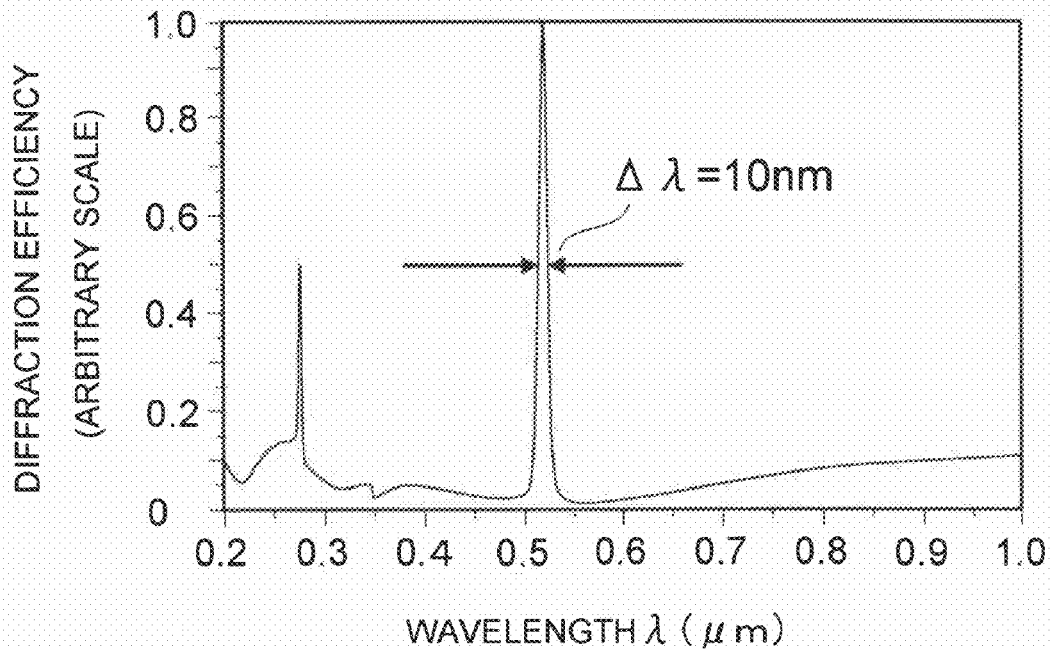
FIGS. 4A and 4B illustrate a simulation result for the wavelength dependence of the reflectance and transmittance of the reflective screen 10 according to the first embodiment.
Figure 4B:
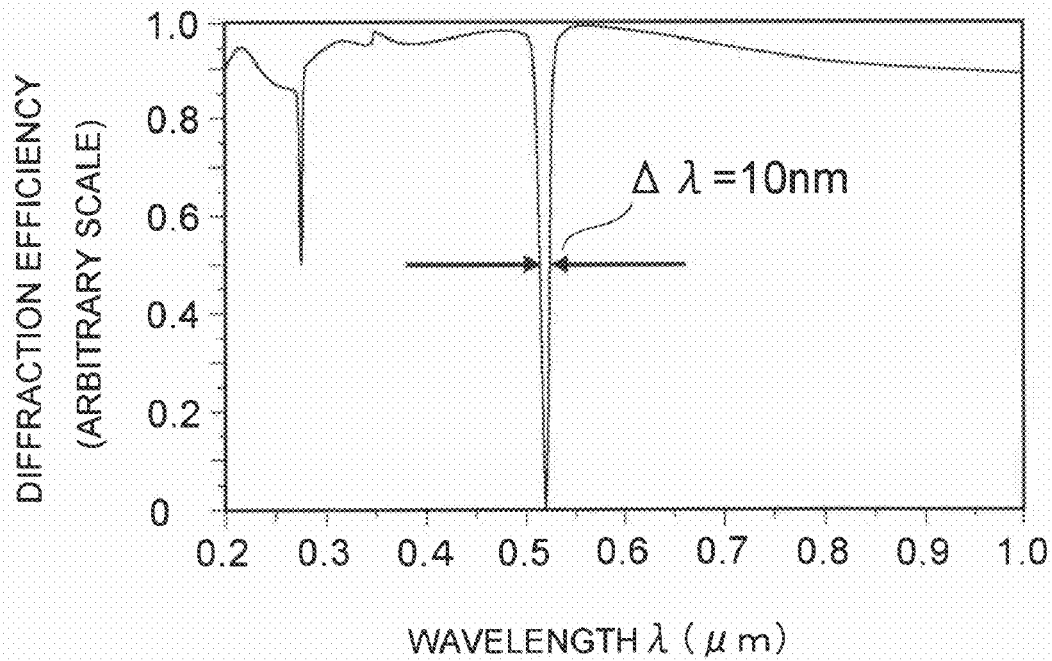

FIGS. 4A and 4B illustrate a simulation result for the wavelength dependence of the reflectance and transmittance of the reflective screen 10 according to the first embodiment, respectively. The horizontal axis represents wavelength $\lambda$, and the vertical axis represents reflectance or transmittance.

The condition of the simulation is t=200 nm and Λ=350 nm.

As shown in FIG. 4A, in the reflective screen 10 according to the first embodiment, reflectance has a very sharp peak at wavelength λ=520 nm, but has very low values in the other wavelengths. It is noted that another peak observed around a wavelength of 275 nm is irrelevant because it is outside the visible light region.

As shown in FIG. 4B, transmittance has a very sharp valley at wavelength λ=520 nm, but is high in the other wavelengths. It is noted likewise that another valley of transmittance observed around a wavelength of 275 nm is irrelevant because it is outside the visible light region.

While FIGS. 4A and 4B show the simulation result for reflectance and transmittance, absorptance was substantially zero.

Thus, the reflective screen 10 of the first embodiment has a reflectance peak at a specific wavelength (520 nm in this example), and the peak width Δλ is approximately 10 nm (a width of ±5 nm for the given wavelength λ). By projecting light of this wavelength λ as an image including image information on the reflective screen 10, a very bright projected image can be visually presented. Because of high transmittance for light of wavelengths other than wavelength λ, the background image of the reflective screen 10 can be viewed with high brightness and viewability.

In the case of a holographic screen disclosed in JP-A-9-101478, the peak width Δλ of reflectance is approximately 20 nm, and light other than the desired wavelength λ is also reflected. This results in low transmittance for light other than the prescribed wavelength. Hence, the background image of the screen produces a dark and obscure display.

In contrast, the reflective screen 10 of this embodiment substantially reflects only the light having a prescribed wavelength λ, and transmits the other light with no substantial loss. Thus, only the light having a prescribed wavelength is reflected with high reflectance to visually present a bright image, and light of the other wavelengths is transmitted with high transmittance, so that an easily viewable display can be realized. Hence, this embodiment provides a display realizing high reflectance while retaining high transmittance.

In the reflective screen 10 of this embodiment, the period Λ of the periodic film 120 is set to 400/(N+1) to 680/(N−1) nm. This is based on the fact that it is practically suitable to define the visible light wavelengths so that the lower bound on the short-wavelength side is 400 nm and the upper bound on the long-wavelength side is 680 nm, although JIS Z8120 defines it so that the short-wavelength side is 360-400 nm and the long-wavelength side is 760-830 nm.

Second Embodiment

Next, a second embodiment of the invention is described.

Figure 5:
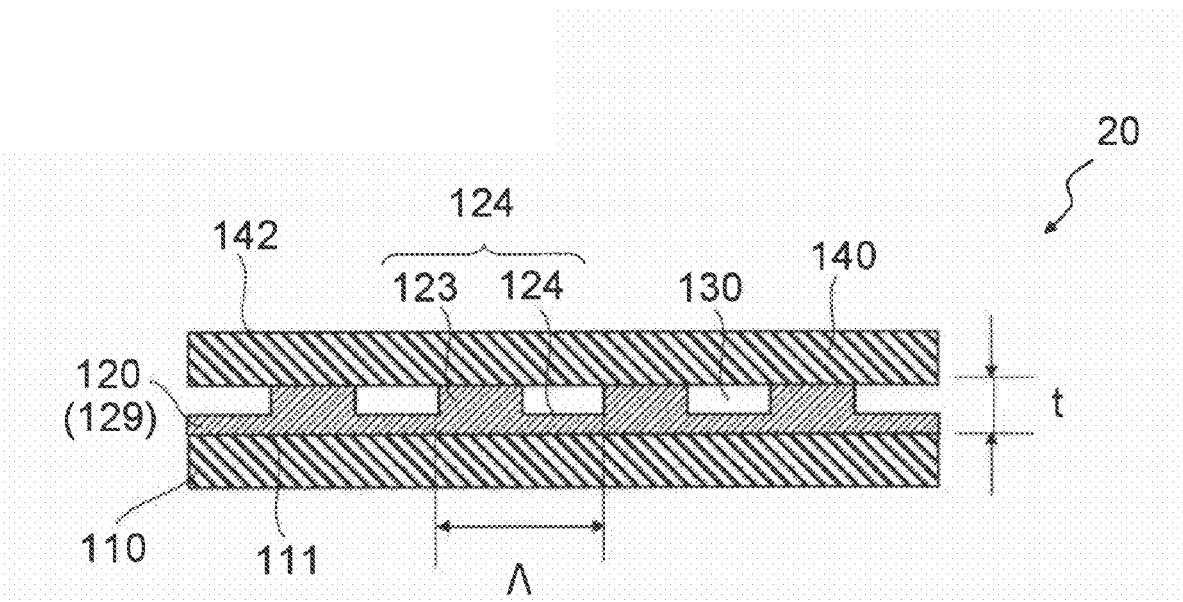
FIG. 5 is a schematic cross-sectional view illustrating the configuration of a reflective screen according to a second embodiment of the invention.

FIG. 5 is a schematic cross-sectional view illustrating the configuration of a reflective screen according to the second embodiment of the invention.

As shown in FIG. 5, in addition to the reflective screen 10 of FIG. 1, the reflective screen 20 according to the second embodiment includes an upper layer 140 above the protrusion 123 of the periodic film 120 (periodic structure 129). That is, the reflective screen 20 further includes a protective layer (upper layer 140) provided on the side of the periodic film 120 opposite to the substrate 110 and protecting the periodic film 120.

This serves to prevent any foreign matter from entering the recess 124 of the periodic film 120. Foreign matter entering the recess 124, if any, is detrimental to achieving desired optical characteristics. However, the upper layer 140 serves to prevent entry of foreign matter and provide a reflective screen with high performance and stable quality.

The upper layer 140 can illustratively be made of a material having a refractive index lower than the second refractive index $n_2$, or may be made of the same material as the substrate 110.

Furthermore, an adhesive layer (not shown), for example, can be provided on the lower surface of the substrate 110 (the surface opposite to the major surface 111) or the upper surface 142 of the upper layer 140 so as to be stuck to another plate-like transparent body. For example, an acrylic resin-based adhesive can be used to provide a substantially transparent adhesive layer, by which the reflective screen 20 can be stuck to a car windshield, for example. Hence, this embodiment can provide a display device (head-up display) and a car (mobile apparatus) realizing high reflectance while retaining high transmittance.

Third Embodiment

Next, a third embodiment of the invention is described.

Figure 6:
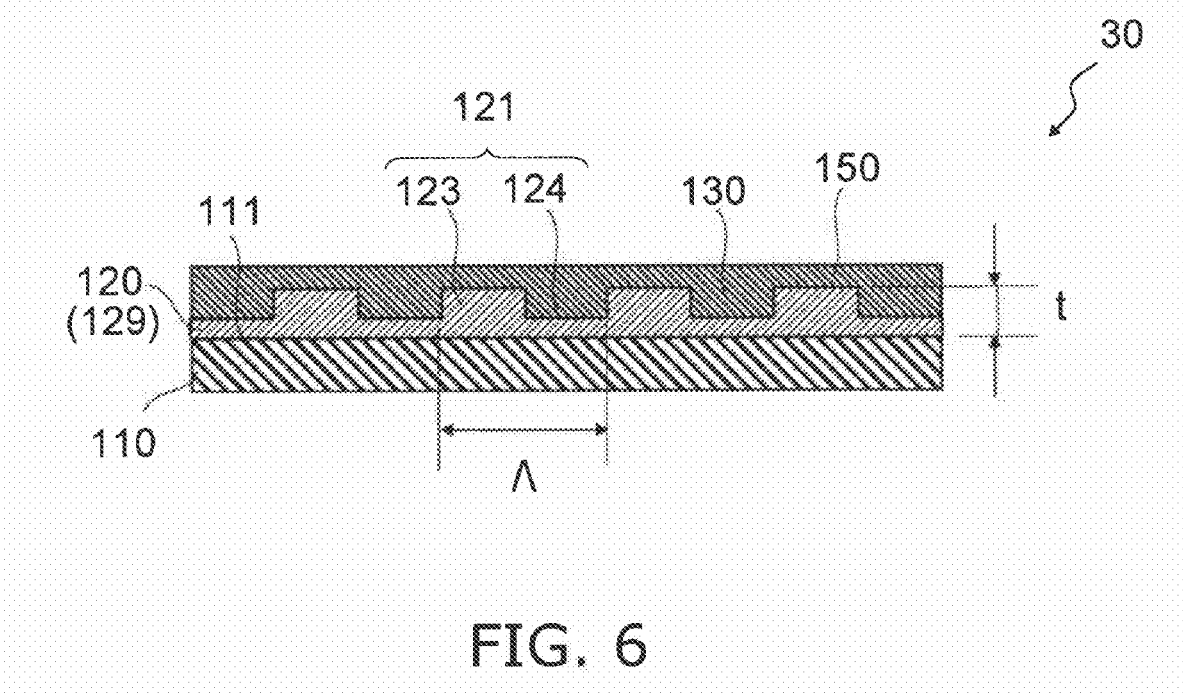
FIG. 6 is a schematic cross-sectional view illustrating the configuration of a reflective screen according to a third embodiment of the invention.

FIG. 6 is a schematic cross-sectional view illustrating the configuration of a reflective screen according to the third embodiment of the invention.

As shown in FIG. 6, in addition to the reflective screen 10 of FIG. 1, the reflective screen 30 according to the third embodiment includes a low-refractive-index layer 150 in the upper region 130 above the periodic film 120. The low-refractive-index layer 150 has a refractive index $n_l$ lower than the second refractive index $n_2$ of the periodic film 120. The low-refractive-index layer 150 can illustratively be made of an acrylic resin, and $n_l$ can be set to 1.49. That is, the reflective screen 30 further includes a low-refractive-index layer 150 provided on the side of the periodic film 120 opposite to the substrate 110 and having a refractive index lower than the second refractive index.

Hence, this embodiment can make effective use of optical periodicity of the periodic film 120 while protecting the periodic film 120.

Fourth Embodiment

Next, a fourth embodiment of the invention is described.

Figure 7:
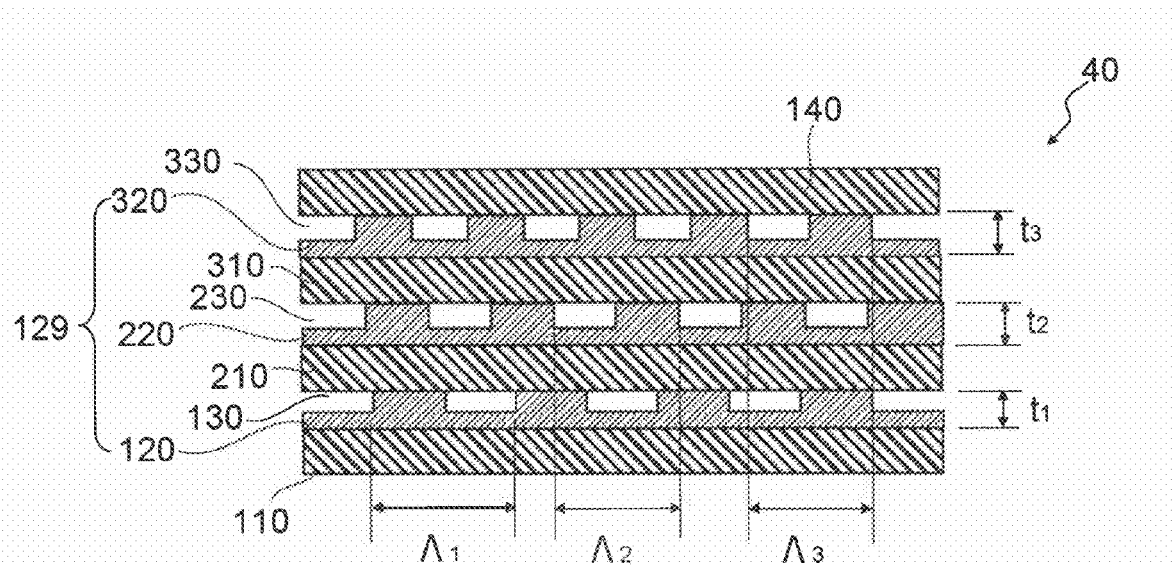
FIG. 7 is a schematic cross-sectional view illustrating the configuration of a reflective screen according to a fourth embodiment of the invention.

FIG. 7 is a schematic cross-sectional view illustrating the configuration of a reflective screen according to the fourth embodiment of the invention.

As shown in FIG. 7, the reflective screen 40 according to the fourth embodiment has a stacked structure of three periodic films. More specifically, a first periodic film 120 having a first period $\Lambda_1$ and a first thickness $t_1$, a second periodic film 220 having a second period $\Lambda_2$ and a second thickness $t_2$, and a third periodic film 320 having a third period $\Lambda_3$ and a third thickness $t_3$ are stacked. The first periodic film 120 is provided on the first substrate (substrate 110). Furthermore, a second substrate 210 is provided between the first periodic film 120 and the second periodic film 220, a third substrate 310 is provided between the second periodic film 220 and the third periodic film 320, and an upper layer 140 is provided above the third periodic film 320. In the above structure, the first periodic film 120, the second periodic film 220, and the third periodic film 320 constitute a periodic structure 129.

Furthermore, the first period $\Lambda_1$, the second period $\Lambda_2$, and the third period $\Lambda_3$ are set so as to reflect the wavelengths of the three primary colors of light, respectively.

For example, the first period $\Lambda_1$ can be set to 0.29 μm or 0.81 μm so as to reflect red light (e.g., wavelength 630 nm).

The second period $\Lambda_2$ can be set to 0.24 μm or 0.68 μm so as to reflect green light (e.g., wavelength 530 nm).

The third period $\Lambda_3$ can be set to 0.21 μm or 0.58 μm so as to reflect blue light (e.g., wavelength 450 nm).

Thus, various colors can be reproduced by a light source having three wavelengths, e.g., a wavelength of 630 nm as red light, a wavelength of 530 nm as green light, and a wavelength of 450 nm as blue light. Furthermore, high transmittance is achieved for wavelengths other than these three wavelengths. Thus, the reflective screen 40 can provide a highly viewable color display realizing high reflectance while retaining high transmittance. Hence, the reflective screen 40 can realize a head-up display and a car realizing high reflectance while retaining high transmittance.

The foregoing illustrates the case where the periodic structure 129 includes three periodic films. However, the structure is not limited thereto, but can include a stack of k periodic films. Here, for k light wavelengths $\lambda_k$ which produce an achromatic color upon color mixing, k periodic films can be stacked, each including a corrugation with regularity of period $\Lambda_k$ in the range of $\lambda_k/(N-1)$ to $\lambda_k/(N+1)$.

The reflective screen 40 illustrated in FIG. 7 includes the second substrate 210 and the third substrate 310 between the periodic films. However, the low-refractive-index layer illustrated in FIG. 6 can be provided instead of the second substrate and the third substrate.

Figure 8:
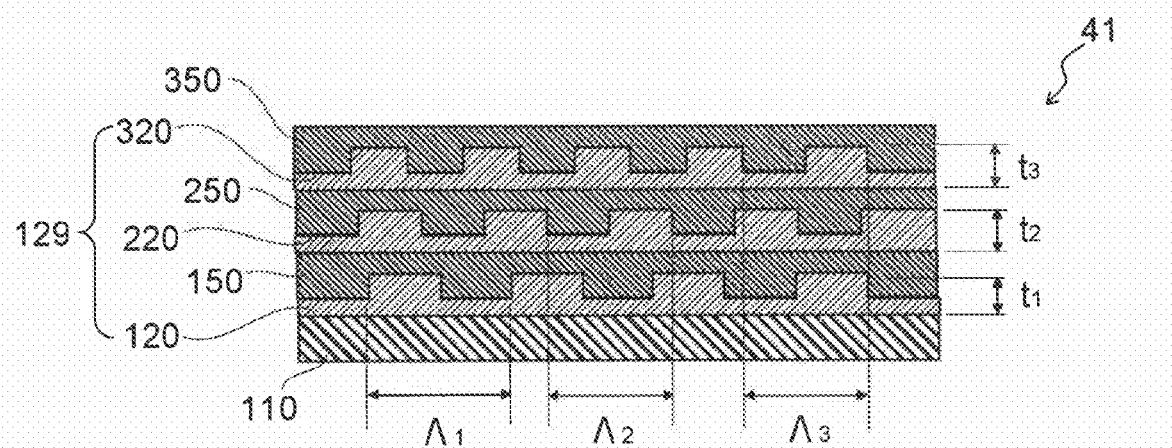
FIG. 8 is a schematic cross-sectional view illustrating the configuration of a variation of the reflective screen according to the fourth embodiment of the invention.

FIG. 8 is a schematic cross-sectional view illustrating the configuration of a variation of the reflective screen according to the fourth embodiment of the invention.

As shown in FIG. 8, in the reflective screen 41 of the variation according to the fourth embodiment of the invention, a first low-refractive-index layer 150, a second periodic film 220, a second low-refractive-index layer 250, a third periodic film 320, and a third low-refractive-index layer 350 are successively stacked on the first periodic film 120. The reflective screen 41 of this structure can also reflect three specific wavelengths and display various colors. Thus, the reflective screen 41 can provide a highly viewable color display realizing high reflectance while retaining high transmittance. Hence, the reflective screen 41 can realize a head-up display and a car realizing high reflectance while retaining high transmittance.

Fifth Embodiment

Next, a fifth embodiment of the invention is described.

Figure 9:
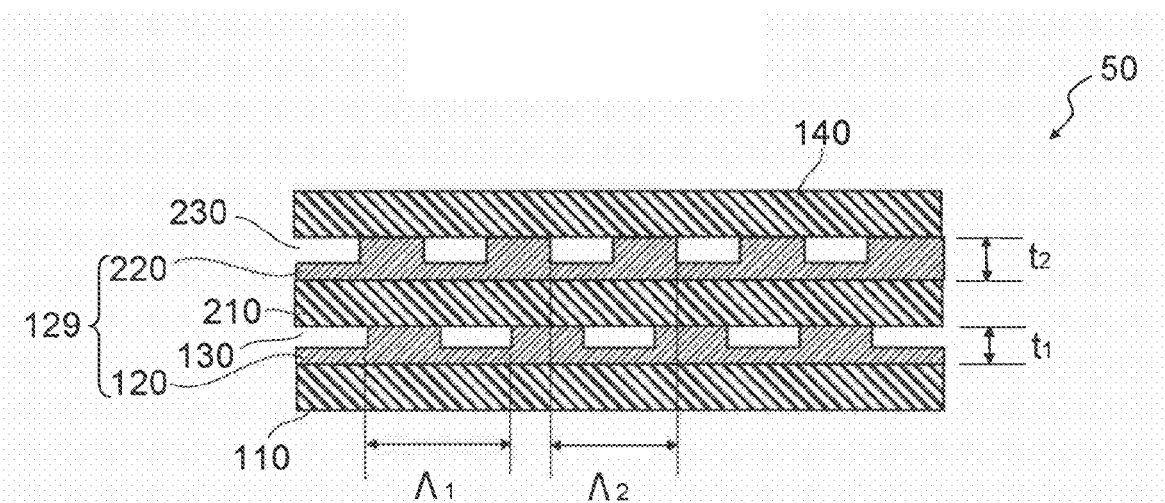
FIG. 9 is a schematic cross-sectional view illustrating the configuration of a reflective screen according to a fifth embodiment of the invention.

FIG. 9 is a schematic cross-sectional view illustrating the configuration of a reflective screen according to the fifth embodiment of the invention.

As shown in FIG. 9, the reflective screen 50 according to the fifth embodiment is different from the reflective screen 40 illustrated in FIG. 7 in that two periodic layers are provided. More specifically, a first periodic film 120 having a first period $\Lambda_1$ and a first thickness $t_1$, and a second periodic film 220 having a second period $\Lambda_2$ and a second thickness $t_2$ are stacked. The first periodic film 120 is provided on the first substrate (substrate 110), a second substrate 210 is provided between the first periodic film 120 and the second periodic film 220, and an upper layer 140 is provided above the second periodic film 220. In the above structure, the first periodic film 120 and the second periodic film 220 constitute a periodic structure 129.

Furthermore, the first period $\Lambda_1$ and the second period $\Lambda_2$ are respectively set so as to reflect light of two wavelengths which produce a generally white color upon color mixing.

For example, the two wavelengths can be selected so that the first light is red light (the first wavelength $\lambda_1$ is illustratively 635 nm) and the second light is cyan light (the second wavelength $\lambda_2$ is illustratively 490 nm).

More specifically, the first period $\Lambda_1$ can be set to 0.42 μm so as to reflect red light ($\lambda_1$=630 nm).

The second period $\Lambda_2$ can be set to 0.33 μm so as to reflect cyan light ($\lambda_2$=490 nm).

Here, the reflective screen 50 reflects light of these two colors with high reflectance. Furthermore, the two colors are in the relation of complementary colors, so that the white color (achromatic color) can be displayed. Thus, a nearly natural color display can be produced.

This embodiment is described below in more detail.

Figure 10:
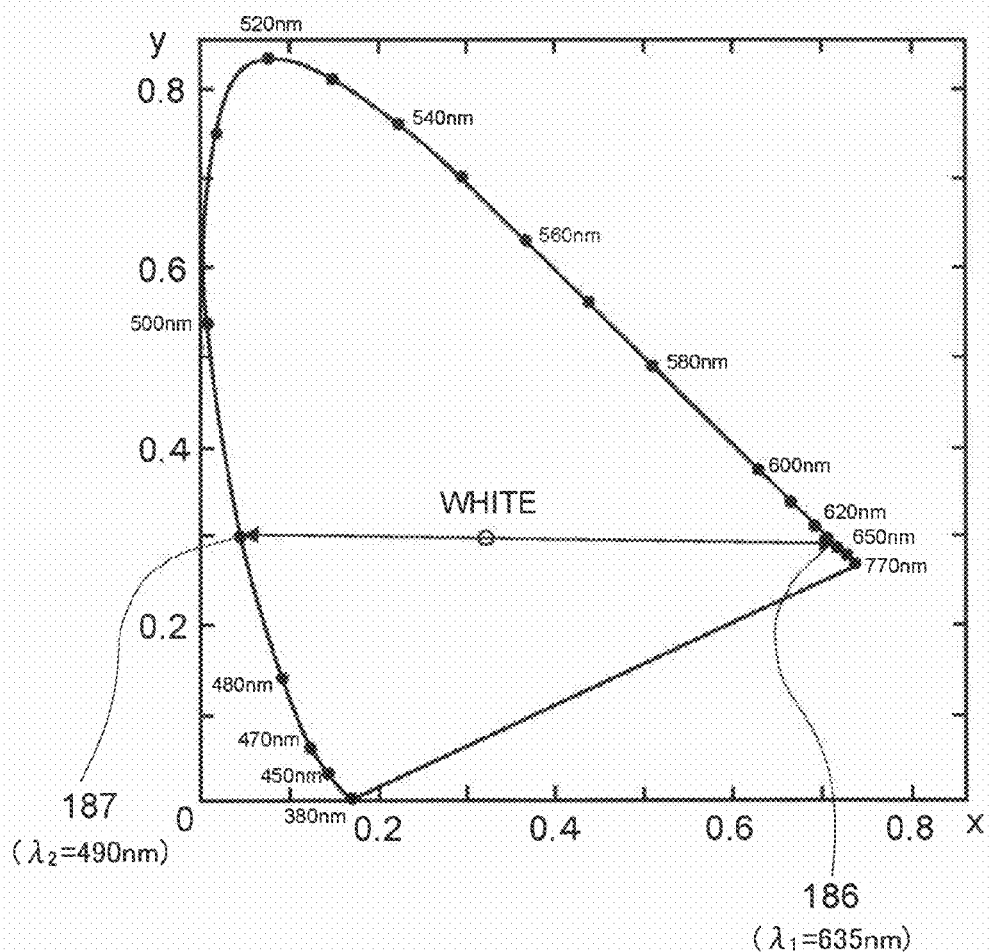
FIG. 10 is a CIE chromaticity diagram illustrating the characteristics of the reflective screen according to the fifth embodiment of the invention.

FIG. 10 is a CIE chromaticity diagram illustrating the characteristics of the reflective screen according to the fifth embodiment of the invention.

More specifically, FIG. 10 is a CIE 1931 XYZ chromaticity diagram showing the characteristics of the reflective screen 50 according to the fifth embodiment. As shown in FIG. 10, the first light 186 having the first wavelength $\lambda_1$=635 nm and the second light 187 having the second wavelength $\lambda_2$=490 nm are in the relation of complementary colors and located on a straight line passing through the white color (achromatic color) in the chromaticity diagram. Hence, various colors including the white color (achromatic color) can be displayed in accordance with the mixing ratio between the first light 186 and the second light 187. In an example where the first light 186 having the first wavelength $\lambda_1$=635 nm and the second light 187 having the second wavelength $\lambda_2$=490 nm are each generated by a laser, if the first light 186 is outputted at 12 mW and the second light 187 is outputted at 23 mW, then the white color (achromatic color) is obtained with a luminous flux of 5 lm.

The reflective screen 50 having the two-layer structure illustrated in FIG. 9 is simpler in structure than the reflective screen 40 having the three-layer structure illustrated in FIG. 7, and very useful in practical applications. For example, the reflective screen used for a display device such as a head-up display rarely displays a natural image. The displayed image illustratively includes a display of car status information such as car speed, neighborhood maps, traffic signs, and navigation directions, which is not a natural image, although virtually a multicolor display. Hence, in practice, it is often sufficient to use a color display formed from two light sources with two wavelengths. Thus, the reflective screen 50 having the two-layer structure is superior in structural simplicity and performance, highly reliable, and feasible at low cost.

In the foregoing, the white color (achromatic color) only needs to be substantially achromatic, but preferably, on the CIE 1931 XYZ chromaticity diagram, x is in the range of 0.25-0.40, and y is in the range of 0.25-0.40.

Furthermore, the reflective screen 50 illustrated in FIG. 9 is effective in increasing practical transmittance. This point is described below.

Figure 11:
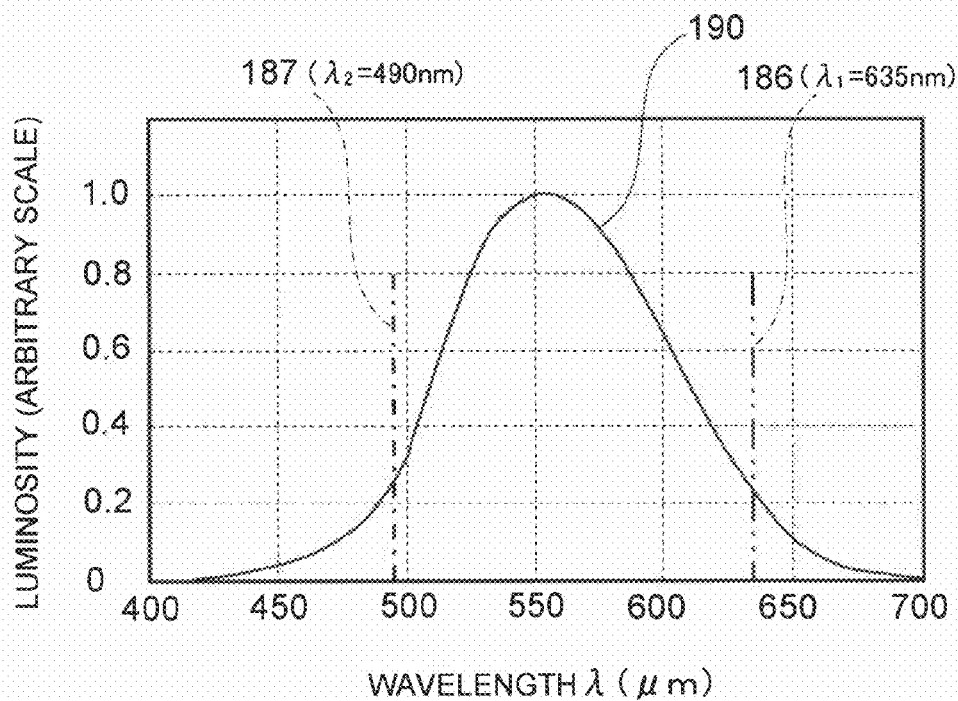
FIG. 11 is a graph illustrating the relation of luminosity (visibility) to the characteristics of the reflective screen according to the fifth embodiment of the invention.

FIG. 11 is a graph illustrating the relation of luminosity (visibility) to the characteristics of the reflective screen according to the fifth embodiment of the invention.

In FIG. 11, the horizontal axis represents wavelength, and the vertical axis represents luminosity or light intensity. As shown by the solid line in FIG. 11, the luminosity 190 is highest for green light (wavelength 555 nm) and decreases for light of shorter or longer wavelengths. In the case of a display device in which green light (e.g., wavelength 555 nm) is projected on the reflective screen, the image projection light having a wavelength of 555±5 nm cannot be transmitted therethrough even if the reflective screen of this embodiment is used. Hence, in this wavelength range, light from the background cannot be transmitted. Here, the reflective screen not transmitting the light with high luminosity around 555 nm gives in actual use the impression that the transmitted light is dark, and the reflective screen may be inferior in the viewability of the background image.

In contrast, as the image projection light, the reflective screen 50 of this embodiment does not use green light, which has high luminosity, but uses two light wavelengths, that is, red light (e.g., 635 nm) and cyan light (e.g., 490 nm). Hence, the background image of the green light with high luminosity is directly viewable without substantially decreasing the brightness. Furthermore, various colors including the white color (achromatic color) can be represented by the red light and the cyan light in the relation of complementary colors. Hence, this embodiment can realize a reflective screen capable of very useful display in practical applications.

It is noted that the low-refractive-index layer can be used also in the case of the reflective screen having the two-layer structure.

Figure 12:
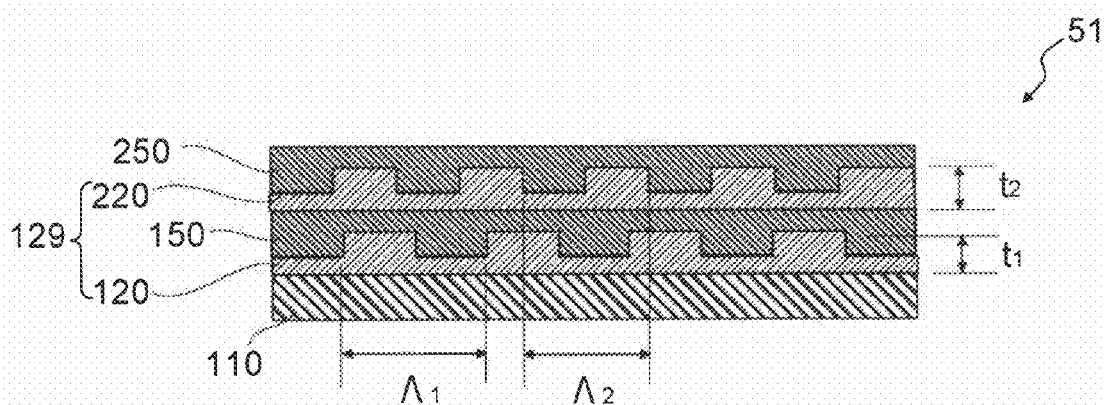
FIG. 12 is a schematic cross-sectional view illustrating the configuration of a variation of the reflective screen according to the fifth embodiment of the invention.

FIG. 12 is a schematic cross-sectional view illustrating the configuration of a variation of the reflective screen according to the fifth embodiment of the invention.

As shown in FIG. 12, in the reflective screen 51 of the variation according to the fifth embodiment of the invention, a first low-refractive-index layer 150, a second periodic film 220, and a second low-refractive-index layer 250 are successively stacked on the first periodic film 120. That is, the reflective screen 51 further includes a low-refractive-index layer provided on the side of at least one of the k periodic films opposite to the substrate 110 and having a lower refractive index than the periodic film.

The reflective screen 51 of this structure can also reflect two specific wavelengths and display various colors. Thus, the reflective screen can provide a highly viewable color display realizing high reflectance while retaining high transmittance. Hence, the reflective screen can realize a head-up display (display device) and a car (mobile apparatus) realizing high reflectance while retaining high transmittance.

Sixth Embodiment

Next, a display device of a sixth embodiment of the invention is described.

Figure 13:
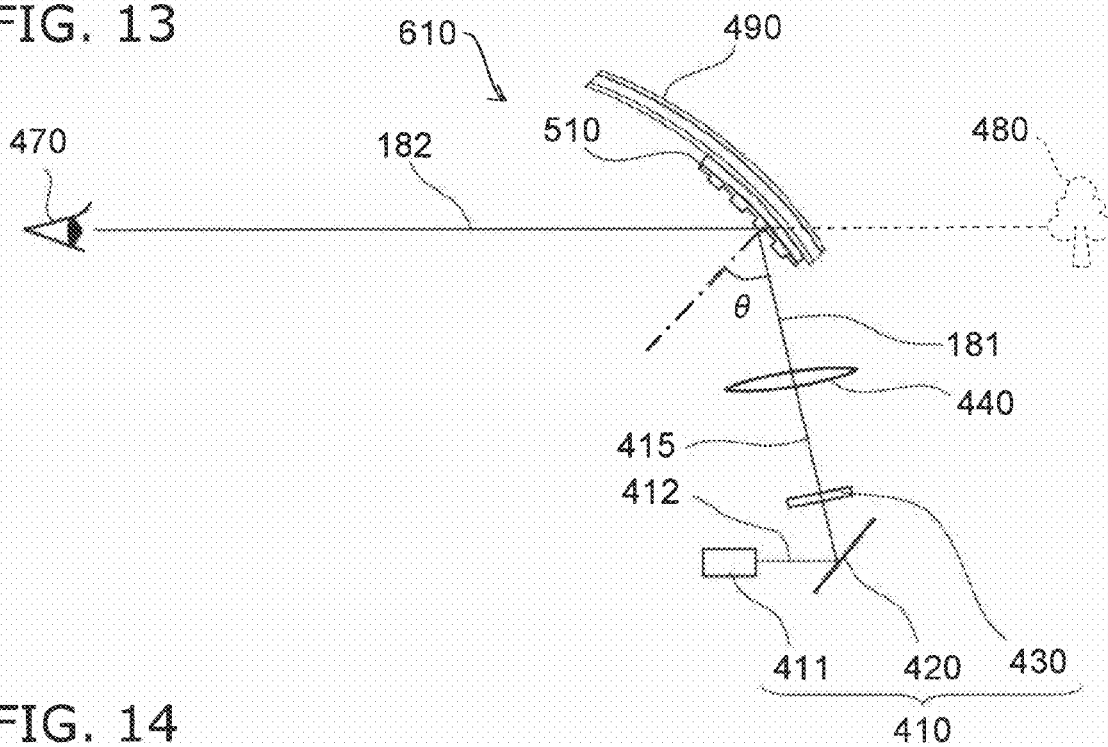
FIG. 13 is a schematic view illustrating the configuration and service condition of the display device according to a sixth embodiment of the invention.

FIG. 13 is a schematic view illustrating the configuration and service condition of the display device according to the sixth embodiment of the invention.

As shown in FIG. 13, the display device 610 according to the sixth embodiment includes a light generator 410 for generating light 415 of wavelength $\lambda$ including an image, and a reflective screen 510 on which the light 415 is projected at incident angle $\theta$. The light generator 410 illustratively includes a light source 411 for generating light 412 of wavelength $\lambda$, a reflective mirror 420, and an image screen 430. The image screen 430 serves as a light shutter for the light 412 and can illustratively be made of a liquid crystal display panel. The light source 411 can illustratively be based on any of various solid-state lasers, gas lasers, and semiconductor lasers. A desired wavelength $\lambda$ can be set by suitably selecting the light source 411. Besides the foregoing configuration, the light generator 410 can be based on any of various configurations, such as a liquid crystal display panel with a backlight, a combination of a light source and a MEMS (microelectromechanical system) scanner, and a combination of a light source and a scanning mirror.

The light 415 travels through a lens 440 for adjusting the light beam, is reflected from the reflective screen 510, and reaches a viewer 470. The viewer 470 can view an image (virtual image) 480 formed on the reflective screen 510. For example, the reflective screen 510 is attached to the inside (in-car side), for example, of the windshield (window) 490 of a car or the like. Here, the reflective screen 510 is transmissive as well as reflective, and the viewer 470 can view the background image outside the car through the reflective screen 510 simultaneously with the image 480 of the image information based on the light 415. It is noted that the lens 440 may be provided as needed. Furthermore, as an alternative configuration, the reflective mirror 420 may be omitted, and the light 412 may be directly incident on the image screen 430. Thus, various optical layouts can be used.

In the display device 610 of this embodiment, those equivalent to the reflective screen 10 illustrated in FIG. 1 can be used as the reflective screen 510.

Figure 14:
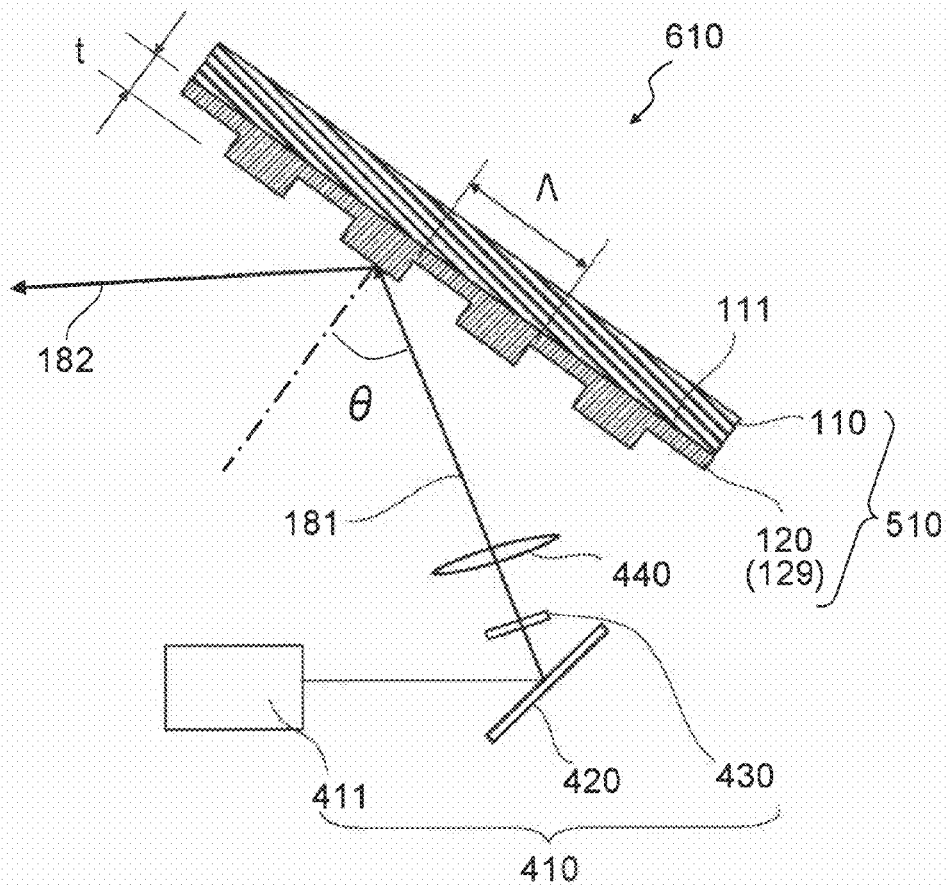
FIG. 14 is a schematic view illustrating the configuration of the display device according to the sixth embodiment of the invention.

FIG. 14 is a schematic view illustrating the configuration of the display device according to the sixth embodiment of the invention.

As shown in FIG. 14, in the display device 610 according to the sixth embodiment, the reflective screen 510 includes a substrate 110 having a first refractive index $n_1$. Furthermore, a periodic film 120 is provided on the major surface 111 of the substrate 110. The periodic film 120 serves as a periodic structure 129. The periodic film 120 has a second refractive index $n_2$ that is higher than the first refractive index $n_1$, and includes a corrugation with regularity of period $\Lambda$ which is equal to $\lambda/(N+\sin\theta)$ or $\lambda/(N-\sin\theta)$ for equivalent refractive index N and wavelength $\lambda$. For example, if the refractive index (first refractive index) $n_1$ of the substrate 110 is 1.45, the refractive index (second refractive index) $n_2$ of the periodic film 120 is 1.9, and the thickness t of the periodic film 120 is 180 nm, then the equivalent refractive index N as determined by equation (1) is 1.49.

In the display device with the incident angle $\theta$ being set to 45 degrees, for example, if the wavelength $\lambda$ of the light 415 is 530 nm (green light), then the period $\Lambda$ can be set to 0.24 μm or 0.68 μm. In this case, the reflective screen 510 reflects the light 415 having a wavelength $\lambda$ of 530 nm and transmits light of the other wavelengths.

If the wavelength $\lambda$ of the light 415 is 630 nm (red light), then the period $\Lambda$ can be set to 0.29 μm or 0.81 μm. In this case, the reflective screen 510 reflects the light having a wavelength $\lambda$ of 630 nm and transmits light of the other wavelengths.

If the wavelength $\lambda$ of the light 415 is 450 nm (blue light), then the period $\Lambda$ can be set to 0.21 μm or 0.58 μm. In this case, the reflective screen 510 reflects the light having a wavelength $\lambda$ of 450 nm and transmits light of the other wavelengths.

In the above cases, as described earlier, the reflective screen 510 exhibits reflection characteristics with very high wavelength selectivity in which the wavelength width $\Delta\lambda$ is approximately 10 nm.

Although the incident angle $\theta$ is 45 degrees in the foregoing example, it is not limited thereto. The period $\Lambda$ of the corrugation of the periodic film 120 can be set to $\lambda/(N+\sin\theta)$ or $\lambda/(N-\sin\theta)$. In these cases, the reflective screen 510 exhibits reflection characteristics with very high wavelength selectivity in which the wavelength width $\Delta\lambda$ is approximately 10 nm.

Thus, in the display device of this embodiment, the light 415 of wavelength $\lambda$ including image information is projected on the reflective screen 510 at incident angle $\theta$. The reflective screen 510 includes a substrate 110 having a first refractive index $n_1$ and a periodic film 120 having a second refractive index $n_2$ that is higher than the first refractive index $n_1$. The periodic film 120 includes a corrugation with regularity of period $\Lambda$ which is equal to $\lambda/(N+\sin\theta)$ or $\lambda/(N-\sin\theta)$ for equivalent refractive index N and wavelength $\lambda$. Thus, the light 415 of wavelength λ at incident angle θ is reflected with no substantial loss, and light of the other wavelengths undergoes no substantial decrease in transmittance. Hence, this embodiment provides a highly viewable display realizing high reflectance while retaining high transmittance. Thus, this embodiment can realize a car realizing high reflectance while retaining high transmittance, thereby enabling safe travel.

Seventh Embodiment

Next, a display device of a seventh embodiment of the invention is described. The display device of the seventh embodiment is an example based on the reflective screen having the two-layer structure illustrated in FIG. 12.

Figure 15:
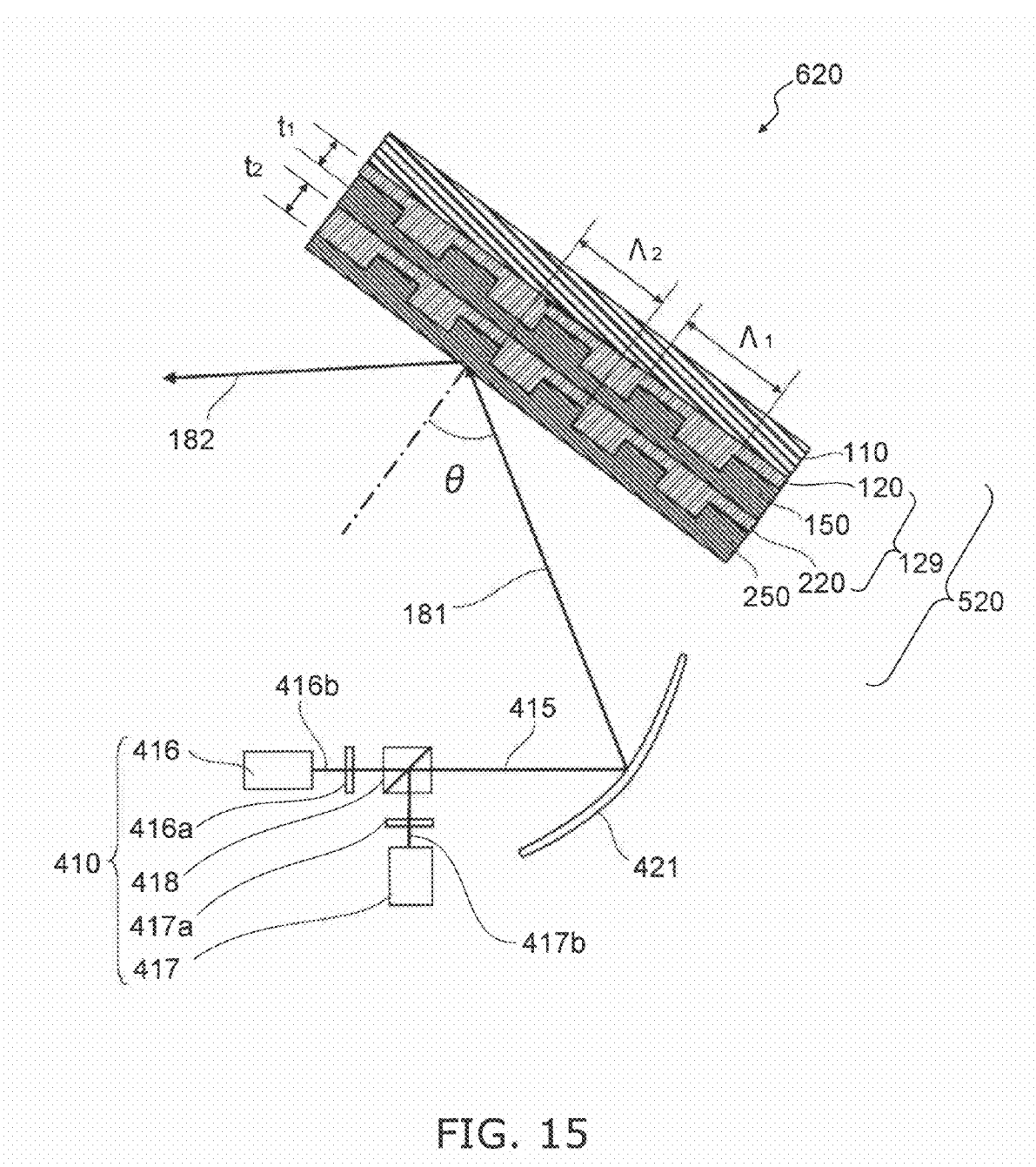
FIG. 15 is a schematic view illustrating the configuration of the display device according to a seventh embodiment of the invention.

FIG. 15 is a schematic view illustrating the configuration of the display device according to the seventh embodiment of the invention.

As shown in FIG. 15, the display device 620 according to the seventh embodiment includes a light generator 410 for generating light 415 including an image, and a reflective screen 520 on which the light 415 is projected at incident angle θ.

The light generator 410 includes a first light source 416 for generating first light 416b having a first wavelength $\lambda_1$, and a first image screen 416a on which the first light is incident. Furthermore, the light generator 410 includes a second light source 417 for generating second light 417b having a second wavelength $\lambda_2$, and a second image screen 417a on which the second light is incident. The light generator 410 further includes a half mirror 418, by which the first light 416b and the second light 417b are combined into light 415 including an image composed of two wavelengths $\lambda_1$, $\lambda_2$. By way of a concave mirror 421, the light 415 is incident as incident light 181 on the reflective screen 520 at incident angle θ and reflected therefrom, and the reflected light 182 reaches a viewer 470. It is noted that the above optical system can be based on any of various configurations.

In the above display device 620, a desired wavelength λ can be set by suitably selecting the light source. In this embodiment, the first light source 416 and the second light source 417 can illustratively be based on semiconductor lasers. Furthermore, the first wavelength $\lambda_1$ can be 635 nm (red light), and the second wavelength $\lambda_2$ can be 490 nm (cyan light). That is, the number k of light wavelengths is two, and the light generator 410 generates two light wavelengths, that is, first light 416b having the first wavelength $\lambda_1$ (635 nm) and second light 417b having the second wavelength $\lambda_2$ (490 nm), which produce an achromatic color upon color mixing. The first light 416b and the second light 417b are combined into light 415.

In the display device 620 illustrated in FIG. 15, the reflective screen 520 includes a substrate 110 having a first refractive index $n_1$. Furthermore, a first periodic film 120 is provided on the major surface 111 of the substrate 110. The first periodic film 120 has a second refractive index $n_2$ that is higher than the first refractive index $n_1$, and includes a corrugation with regularity of period $\Lambda_1$ which is equal to $\lambda_1/(N_1+\sin\theta)$ or $\lambda_1/(N_1-\sin\theta)$ for a first equivalent refractive index $N_1$ and the first wavelength $\lambda_1$. Furthermore, a first low-refractive-index layer 150 having a refractive index $n_{l1}$ is provided on the first periodic film 120. Moreover, a second periodic film 220 is provided on the first low-refractive-index layer 150. The second periodic film 220 has a third refractive index $n_3$ that is higher than the first refractive index $n_1$ and the refractive index $n_{l1}$, and includes a corrugation with regularity of period $\Lambda_2$ which is equal to $\lambda_2/(N_2+\sin\theta)$ or $\lambda_2/(N_2-\sin$ θ) for a second equivalent refractive index $N_2$ and the second wavelength $\lambda_2$. Furthermore, a second low-refractive-index layer 250 having a refractive index $n_{l2}$ is provided on the second periodic film 220.

For example, if the refractive index (first refractive index) $n_1$ of the substrate 110 is 1.45, the refractive index (second refractive index) $n_2$ of the first periodic film 120 is 1.9, the first thickness $t_1$ of the first periodic film 120 is 180 nm, and the refractive index $n_{l1}$ of the first low-refractive-index layer 150 is 1.45, then the first equivalent refractive index $N_1$ as determined by equation (1) is 1.69 for TE polarization (the electric field vector being perpendicular to the page). On the other hand, for TM polarization (the electric field vector being parallel to the page), the first equivalent refractive index $N_1$ is 1.61. Furthermore, if the refractive index (third refractive index) $n_3$ of the second periodic film 220 is 1.9, the second thickness $t_2$ of the periodic film 220 is 180 nm, and the refractive index $n_{l2}$ of the second low-refractive-index layer 250 is 1.45, then the second equivalent refractive index $N_2$ as determined by equation (1) is 1.69 for TE polarization and 1.61 for TM polarization.

In the display device 620 with the incident angle θ being set to 45 degrees, for example, in the case where the light is incident with TE polarization, if the first wavelength $\lambda_1$ is 635 nm (red light), then the period $\Lambda_1$ of the first periodic film 120 can be set to 265 nm or 646 nm. If the second wavelength $\lambda_2$ is 490 nm (cyan light), then the period $\Lambda_2$ of the second periodic film 220 can be set to 205 nm or 500 nm. In the case where the light is incident with TM polarization, if the first wavelength $\lambda_1$ is 635 nm (red light), then the period $\Lambda_1$ of the first periodic film 120 can be set to 274 nm or 703 nm. If the second wavelength $\lambda_2$ is 490 nm (cyan light), then the period $\Lambda_2$ of the second periodic film 220 can be set to 211 nm or 543 nm. It is noted that the first periodic film 120 and the second periodic film 220 constitute a periodic structure 129.

The reflective screen 520 including a stacked layer of these two periodic films 120, 220 reflects only the first wavelength $\lambda_1$ (635 nm) and the second wavelength $\lambda_2$ (490 nm), and transmits light of the other wavelengths. As described earlier, the reflective screen 520 exhibits reflection characteristics with very high wavelength selectivity in which the wavelength width Δλ is approximately 10 nm.

Although the incident angle θ is 45 degrees in the foregoing example, it is not limited thereto. The period $\Lambda_1$ of the corrugation of the first periodic film 120 can be set to $\lambda_1/(N_1+\sin\theta)$ or $\lambda_1/(N_1-\sin\theta)$, and the period $\Lambda_2$ of the corrugation of the second periodic film 220 can be set to $\lambda_2/(N_2+\sin\theta)$ or $\lambda_2/(N_2-\sin\theta)$. In these cases, the reflective screen exhibits reflection characteristics with very high wavelength selectivity in which the wavelength width Δλ is approximately 10 nm.

Thus, the reflective screen 520 includes a stack of the first periodic film 120 having a corrugation with regularity of period $\Lambda_1$ which is equal to $\lambda_1/(N_1+\sin\theta)$ or $\lambda_1/(N_1-\sin\theta)$ for the first wavelength $\lambda_1$, and the second periodic film 220 having a corrugation with regularity of period $\Lambda_2$ which is equal to $\lambda_2/(N_2+\sin\theta)$ or $\lambda_2/(N_2-\sin\theta)$ for the second wavelength $\lambda_2$. Thus, the light 415 of the first wavelength $\lambda_1$ and the second wavelength $\lambda_2$ at incident angle θ is reflected with no substantial loss, and light of the other wavelengths undergoes no substantial decrease in transmittance. Furthermore, the first wavelength $\lambda_1$ and the second wavelength $\lambda_2$ are selected so as to produce an achromatic color upon color mixing. Hence, this embodiment provides a highly viewable color display realizing high reflectance while retaining high transmittance. Thus, this embodiment can realize a car realizing high reflectance while retaining high transmittance, thereby enabling safe travel.

The foregoing example is based on the case of two wavelengths (the number of kinds of light, k, is two). However, the number of wavelengths (k) can be three or more. Then, the reflective screen is configured to include a stacked layer of k periodic films, each including a corrugation with regularity of period $\Lambda_k$ which is equal to $\lambda_k/(N_k+\sin\theta)$ or $\lambda_k/(N_k-\sin\theta)$ for wavelength $\lambda_k$. Hence, this embodiment provides a highly viewable color display realizing high reflectance while retaining high transmittance. Thus, this embodiment can realize a car realizing high reflectance while retaining high transmittance, thereby enabling safe travel.

The reflective screen of the display device of the above embodiments can illustratively be attached to the car windshield (window). Thus, simultaneously with the image information of the background field outside the car windshield (window), various traffic information can be displayed and viewed on the windshield (window).

Figure 16:
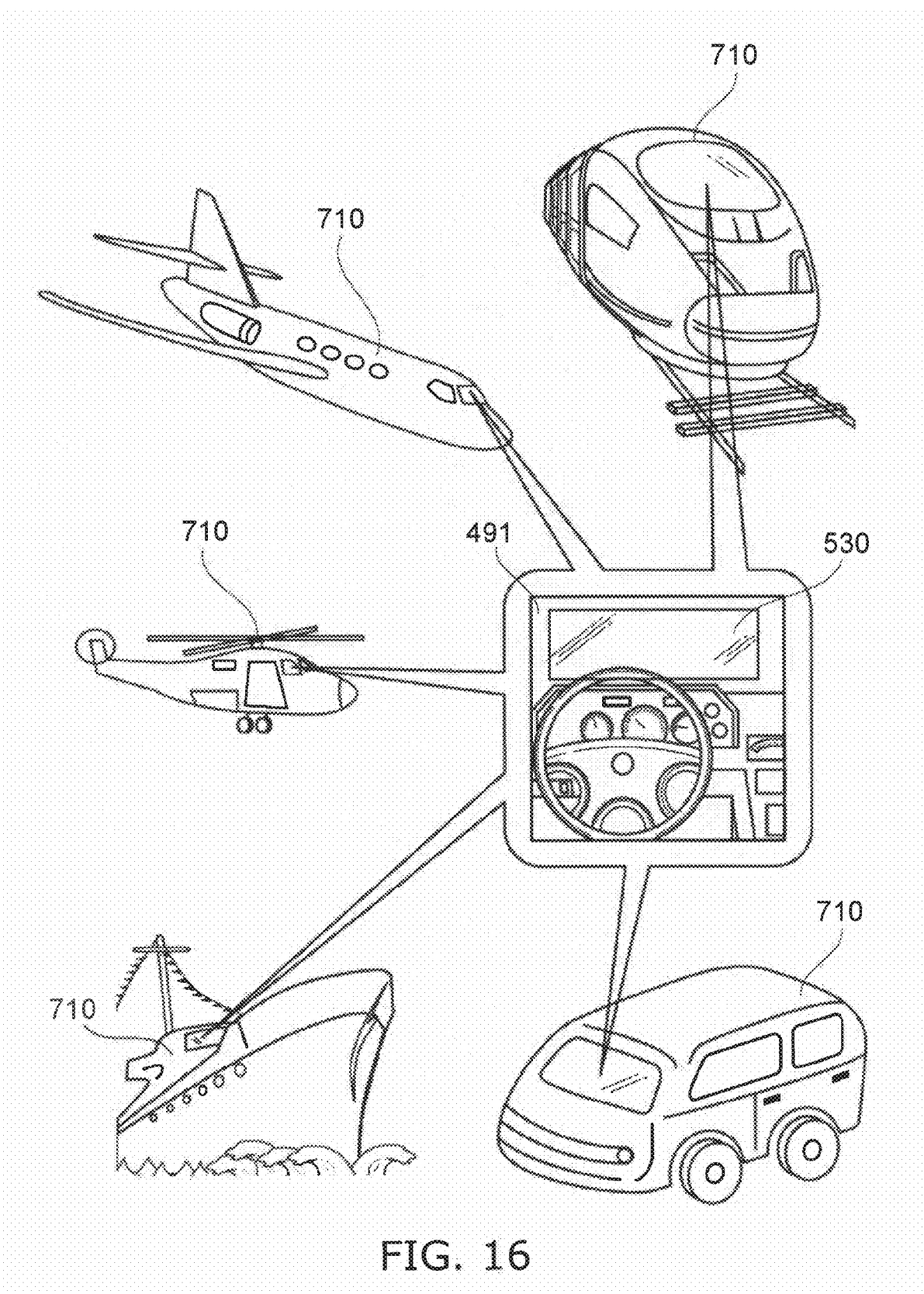
FIG. 16 is a schematic view illustrating a mobile apparatus based on the reflective screen and the display device of the embodiments of the invention.

FIG. 16 is a schematic view illustrating a mobile apparatus based on the reflective screen and the display device of the embodiments of the invention.

As shown in FIG. 16, a reflective screen 530 is provided on the window 491, for example, in various mobile apparatuses 710 of an eighth embodiment of the invention, such as a car, train, ship, helicopter, and aircraft. This screen can be the reflective screen of the embodiments of the invention. The display device of the embodiments of the invention can be used so that light 415 is incident on the reflective screen 530 to project an image thereon. Hence, this embodiment provides a highly viewable color display realizing high reflectance while retaining high transmittance. Thus, this embodiment can realize a mobile apparatus realizing high reflectance while retaining high transmittance, thereby enabling safe travel. The reflective screen 530 can be provided on a glass or any of various resin plates having a flat or curved shape, which constitutes the window 491, for example, of the mobile apparatus. However, the reflective screen 530 can also be provided on a suitable transparent plate-like or sheet-like substrate besides the window 491.

In the reflective screen of the present embodiments, the substrate 110, the low-refractive-index layers 150, 250, 350, and the upper layer 140 can illustratively be made of any of various acrylic resins, such as nonylphenoxypolyethyleneglycol acrylate, nonanediol diacrylate, polypropyleneglycol acrylate, dicyclopentenyloxyethyl methacrylate, dicyclopentanyl methacrylate, pentamethylpiperidyl methacrylate, and modified bisphenol dimethacrylate. Furthermore, various other resins can be used, such as polycarbonates, polyesters, and fluorocarbon resins. Moreover, primarily inorganic materials, such as porous silica and glass, can also be used.

The periodic film 120, 220, 320 can be a high-refractive-index thin film illustratively made of $TiO_2$ (refractive index 2.3), $ZrO_2$ (refractive index 2.0), ITO (refractive index 1.85), $HfO_2$ (refractive index 1.95), or $Ta_2O_5$ (refractive index 2.1), which is patterned illustratively by photolithography and etching techniques. For example, fine particles of the aforementioned materials are mixed into a photosensitive resin, which can be cured and patterned by irradiation with diffracted light having a small period.

In the structures illustrated above, the protrusion 123 and the recess 124 of the corrugation 121 of the periodic film have an equal width. However, the invention is not limited thereto, but the width ratio between the protrusion 123 and the recess 124 is arbitrary. Furthermore, in the foregoing, the structure having a rectangular corrugation is illustrated. However, the invention is not limited thereto, but can use corrugations of various shapes, such as a sinusoidal and triangular shape. Furthermore, in the corrugation 121 as illustrated in FIG. 1B, a periodic corrugation (peaks and valleys) extends in one direction (one dimension). However, the invention is not limited thereto, but the corrugation may be arranged in a planar (two-dimensional) configuration. An equivalent refractive index N is determined for any of such various corrugations, and the period $\Lambda$ of the periodic structure can be suitably set on the basis of this equivalent refractive index N.

The embodiments of the invention have been described with reference to examples. However, the invention is not limited to these examples. For instance, specific configurations of the components constituting the reflective screen, the display device, and the mobile apparatus are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible, and such combinations are also encompassed within the scope of the invention as long as they fall within the spirit of the invention.

Furthermore, those skilled in the art can suitably modify and implement the reflective screen, the display device, and the mobile apparatus described above in the embodiments of the invention, and any reflective screens, display devices, and mobile apparatuses thus modified are also encompassed within the scope of the invention as long as they fall within the spirit of the invention.

Furthermore, those skilled in the art can conceive various modifications and variations within the spirit of the invention, and it is understood that such modifications and variations are also encompassed within the scope of the invention.

The invention claimed is:

1. A reflective screen comprising:
   a substrate having a first refractive index; and
   a periodic structure provided on a major surface of the substrate and including a periodic film, the periodic film having a period $\Lambda$ and being made of a material having a second refractive index being higher than the first refractive index,
   the period $\Lambda$ being not less than $400/(N+1)$ nanometers and not more than $680/(N-1)$ nanometers, the N being an equivalent refractive index of the periodic film, wherein for K light wavelengths $\lambda_k$ which produce an achromatic color upon color mixing, the periodic structure includes a stacked layer of K periodic films, each having an equivalent refractive index $N_k$ associated with the wavelength $\lambda_k$, and having regularity of period $\Lambda_k$ which is not less than $\lambda_k/(N_k+1)$ and not more than $\lambda_k/(N_k-1)$.

2. The screen according to claim 1, further comprising:
   a low-refractive-index layer provided on a side of at least one of the K periodic films opposite to the substrate and having a refractive index being lower than the refractive index of the periodic film.

3. A reflective screen comprising:
   a substrate having a first refractive index; and
   a periodic structure provided on a major surface of the substrate and including a periodic film, the periodic film having a period $\Lambda$ and being made of a material having a second refractive index being higher than the first refractive index,
   the period $\Lambda$ being not less than $400/(N+1)$ nanometers and not more than $680/(N-1)$ nanometers, the N being an equivalent refractive index of the periodic film, wherein the periodic structure includes a stacked film composed of a first periodic film having a first period $\Lambda_1$ and a second periodic film having a second period $\Lambda_2$, the first period $\Lambda_1$ is 0.42 micrometers, and
the second period $\Lambda_2$ is 0.33 micrometers.

4. A reflective screen comprising:
a substrate having a first refractive index; and
a periodic structure provided on a major surface of the substrate and including a periodic film, the periodic film having a period $\Lambda$ and being made of a material having a second refractive index being higher than the first refractive index,
the period $\Lambda$ being not less than 400/(N+1) nanometers and not more than 680/(N−1) nanometers, the N being an equivalent refractive index of the periodic film, wherein
the periodic structure includes a stacked film composed of a first periodic film having a first period $\Lambda_1$, a second periodic film having a second period $\Lambda_2$, and a third periodic film having a third period $\Lambda_3$,
the first period $\Lambda_1$ is one of 0.29 micrometers and 0.81 micrometers,
the second period $\Lambda_2$ is one of 0.24 micrometers and 0.68 micrometers, and
the third period $\Lambda_3$ is one of 0.21 micrometers and 0.58 micrometers.

5. A display device comprising:
a light generator configured to generate light of wavelength $\lambda$ including image information; and
a reflective screen, the light being projected on the reflective screen at incident angle $\theta$,
the reflective screen including:
 a substrate having a first refractive index; and
 a periodic structure provided on a major surface of the substrate and including a periodic film, the periodic film having a period $\Lambda$ and being made of a material having a second refractive index being higher than the first refractive index, and
the period $\Lambda$ being $\lambda/(N+\sin\theta)$ or $\lambda/(N-\sin\theta)$, the N being an equivalent refractive index of the periodic film, wherein
the periodic structure includes a stacked film composed of a first periodic film having a first period $\Lambda_{/1}$ and a second periodic film having a second period $\Lambda_2$,
the first period $\Lambda_1$ is 0.42 micrometers, and
the second period $\Lambda_2$ is 0.33 micrometers.

6. A display device comprising:
a light generator configured to generate light of wavelength $\lambda$, including image information; and
a reflective screen, the light being projected on the reflective screen at incident angle $\theta$,
the reflective screen including:
 a substrate having a first refractive index; and
 a periodic structure provided on a major surface of the substrate and including a periodic film, the periodic film having a period $\Lambda$ and being made of a material having a second refractive index being higher than the first refractive index, and
the period $\Lambda$ being $\lambda/(N+\sin\theta)$ or $\lambda/(N-\sin\theta)$, the N being an equivalent refractive index of the periodic film, wherein
the periodic structure includes a stacked film composed of a first periodic film having a first period $\Lambda_1$, a second periodic film having a second period $\Lambda_2$, and a third periodic film having a third period $\Lambda_3$,
the first period $\Lambda_1$ is one of 0.29 micrometers and 0.81 micrometers,
the second period $\Lambda_2$ is one of 0.24 micrometers and 0.68 micrometers, and
the third period $\Lambda_3$ is one of 0.21 micrometers and 0.58 micrometers.

7. A display device comprising:
a light generator configured to generate light of wavelength $\lambda$ including image information; and
a reflective screen, the light being projected on the reflective screen at incident angle $\theta$,
the reflective screen including:
 a substrate having a first refractive index; and
 a periodic structure provided on a major surface of the substrate and including a periodic film, the periodic film having a period $\Lambda$ and being made of a material having a second refractive index being higher than the first refractive index, and
the period $\Lambda$ being $\lambda/(N+\sin\theta)$ or $\lambda/(N-\sin\theta)$, the N being an equivalent refractive index of the periodic film, wherein
the light generator generates K kinds of light respectively having wavelengths $\lambda_k$ which produce an achromatic color upon color mixing, and
the periodic structure includes a stacked layer of K periodic films, each having an equivalent refractive index $N_k$ associated with the wavelength $\lambda_k$, and having regularity of period $\Lambda_k$ which is $\lambda_k/(N_k+\sin\theta)$ or $\lambda_k/(N_k-\sin\theta)$.

8. The device according to claim 7, wherein
the K is 2, and
the wavelength $\lambda_1$ is 620-650 nanometers, and the wavelength $\lambda_2$ is 470-510 nanometers.

9. The device according to claim 7, wherein
the K is 2,
the wavelength $\lambda_1$ is 620-650 nanometers, and the wavelength $\lambda_2$ is 470-510 nanometers; and
the period $\Lambda_1$ of the first periodic film is 810 nanometers or 290 nanometers, and the period $\Lambda_2$ of the second periodic film is 580 nanometers or 210 nanometers.

10. A mobile apparatus comprising:
a display device including:
 a light generator configured to generate light of wavelength $\lambda$ including image information; and
 a reflective screen, the light being projected on the reflective screen at incident angle $\theta$,
 the reflective screen including:
  a substrate having a first refractive index; and
  a periodic structure provided on a major surface of the substrate and including a periodic film, the periodic film having a period $\Lambda$ and is made of a material having a second refractive index being higher than the first refractive index, and
 the period $\Lambda$ being $\lambda/(N+\sin\theta)$ or $\lambda/(N-\sin\theta)$, the N being an equivalent refractive index of the periodic film; and
a window, the reflective screen attached to the window, wherein
for K light wavelengths $\lambda_k$ which produce an achromatic color upon color mixing, the periodic structure includes a stacked layer of K periodic films, each having an equivalent refractive index $N_k$ associated with the wavelength $\lambda_k$, and having regularity of period $\Lambda_k$ which is not less than $\lambda_k/(N_1+1)$ and not more than $\lambda_k/(N_k-1)$.

11. The screen according to claim 1, further comprising:
a protective layer provided on a side of the periodic film opposite to the substrate and protecting the periodic film.

12. The screen according to claim 3, further comprising:
a protective layer provided on a side of the periodic film opposite to the substrate and protecting the periodic film.

13. The screen according to claim 4, further comprising:
a protective layer provided on a side of the periodic film opposite to the substrate and protecting the periodic film.

* * * * *